2,871,150

METHOD OF CLADDING MOLYBDENUM

William M. Fraser, Cedar Grove, and Walton E. Brush, Pompton Plains, N. J., assignors to Westinghouse Electric Corporation, East Pittsburgh, Pa., a corporation of Pennsylvania No Drawing. Application September 19, 1955
Serial No. 535,282

10 Claims. (Cl. 148—11.5)

This invention relates to clad molybdenum and, more particularly, to a process for producing clad molybdenum and to molybdenum which is clad with chromium- and nickel-containing alloys.

Molybdenum is well known for its high temperature stress and rupture strength and other characteristics which make its use desirable in high temperature applications. Unfortunately, molybdenum tends to oxidize readily at relatively low temperatures, e. g. 400° C., which limits its use. One suggested method to inhibit the oxidization of molybdenum is to clad the material with an oxygen-resistant coating. A process for cladding molybdenum with nickel and Kovar is disclosed in copending application of William M. Fraser and Walton E. Brush, the coinventors herein, S. N. 535,275, now abandoned, filed concurrently with the instant application, titled "Method of Cladding Molybdenum," and owned by the present assignee. According to the teachings of this copending application, a nickel or Kovar cladding box is first fabricated and the sheet molybdenum is fitted into this box, after which the box is sealed. The cladding box containing the molybdenum sheet is then rolled according to a predetermined schedule of heating and rolling. Elaborate vacuum degassing techniques to remove oxygen and other impurities are eliminated by the use of the process disclosed in this copending application, but it is still necessary to fabricate a cladding box.

In addition, nickel- and Kovar-clad molybdenum is limited in performance in some extremely high temperature applications and in these cases it is desirable to clad the molybdenum with materials which have very high temperature resistance, such as alloys containing substantial amounts of chromium and nickel, examples of such alloys being Nichrome and Inconel.

It is the general object of this invention to provide a simplified process for cladding molybdenum.

It is a further object to provide a simplified process for cladding molybdenum which eliminates vacuum outgassing procedures and costly time-consuming preliminary cladding procedures.

It is another object of this invention to provide a heating and rolling schedule for cladding molybdenum.

It is a still further object to provide, as an article of manufacture, molybdenum clad with high-temperature resistant alloys containing substantial amounts of nickel and chromium.

The aforesaid objects of the invention, and other objects which will become apparent as the description proceeds, are achieved by cleaning the molybdenum plate material which is to be clad and also the cladding material, and wrapping the cleaned cladding material entirely around the molybdenum plate so that the wrapped surfaces slightly overlap with some cladding material projecting beyond the ends of the wrapped plate material. The projecting portions of the cladding material are then peened over the ends of the wrapped plate material so as to completely cover same. The wrapped material is then heated in a non-oxidizing atmosphere and is rolled while hot to bond the cladding material to the molybdenum plate. Thereafter the clad plate is heated and rolled to a desired thickness according to a predetermined schedule. If the cladding material is to be of a high-temperature resistant type containing substantial amounts of chromium and nickel, the cladding material is first nickel plated, preferably on one side only, and the nickel plating effects the bond between the molybdenum and chromium- and nickel-containing material during the hot rolling.

In fabricating the clad molybdenum in accordance with the teachings of this invention, cladding sheet material is first prepared in such a size that it will encase the molybdenum plate which is to be clad so that it overlaps itself slightly in the direction of wrap and also protrudes over the ends of the wrapped plate material by a slight amount. These protruding cladding material portions are then peened over the ends of the molybdenum to completely cover same. The size of the molybdenum sheet material to be clad depends upon the application and is not in any way critical, but, as a specific example, the molybdenum plate may measure 4 inches by 5 inches and one-half inch thick. The cladding sheet material for this molybdenum plate may be fabricated of nickel or Kovar plate or of very high-temperature resistant material containing substantial amounts of chromium and nickel, as hereinafter elaborated upon, of a thickness of $\frac{1}{32}$ in. or $\frac{1}{16}$ in., for example. The thickness of the cladding plate is by no means critical and is more governed by the intended use for the clad material, and the foregoing cladding plate thicknesses are only given by way of specific example and not by way of limitation. Kovar is a trademark of Westinghouse Electric Corporation and is described in U. S. Patent 2,062,335. Kovar is essentially an iron, nickel and cobalt alloy having as major constituents about 55% iron, 29% nickel and 16% cobalt.

Before the cladding material is wrapped around the material which is to be clad, the surfaces of the molybdenum and the surfaces of the cladding material are cleaned to remove substantially all surface impurities therefrom. The preferred cleaning technique is sandblasting although any other suitable means for cleaning may be utilized such as hydrogen baking the parts at a temperature of 900° C. for one-half hour or caustic cleaning which may entail dipping the parts to be cleaned into a molten potassium nitrate bath and thereafter washing with hydrochloric acid. Further methods are acid pickling such as removing impurities by rinsing in a mixture of sulphuric and nitric acid or abrasive methods other than sandblasting such as removing impurities with a wire brush and emery cloth. Thus the individual techniques for cleaning the parts to be clad and the cladding sheet material are not critical as long as substantially all surface impurities are removed from the molybdenum and from the surface of the cladding material.

The cladding material-wrapped molybdenum is then placed in a furnace and is heated in a non-oxidizing atmosphere to a temperature of between 1000° C. to 1150° C., the preferred temperature being about 1050° C.; a hydrogen atmosphere is preferred, although an inert atmosphere such as argon may be used, if desired. The heating time required to bring the molybdenum to temperature is dependent upon the size of the plate being heated and upon the characteristics of the furnace, but it has been found that for the specific example as given, an initial heating period of one-half hour is very satisfactory.

The wrapped and heated molybdenum is then removed from the furnace and is rolled immediately to effect a thickness reduction of from 15% to 40%. The preferred thickness reduction which is effected on the first pass is 30% and it has been found that if less than the prescribed minimum thickness reduction is effected, the bond between the molybdenum and the cladding material is apt to be poor. If greater than the prescribed maximum thickness reduction is effected, the molybdenum is apt to be cracked.

If higher temperature materials are desired for the cladding material, it has been found desirable to use nickel- and chromium-containing alloys wherein the nickel constitutes at least 10% by weight of the alloy and the chromium constitutes at least 5% by weight the alloy. Alloys which contain relatively large amounts of chromium, such as over 5%, are very difficult to bond to molybdenum. It is theorized that the chromium oxide creates this difficulty. If the nickel is first plated onto a substantially impurity-free surface of the chrome-containing alloy, before any heating is effected, the nickel seals off all possibilities for the chromium oxidizing. During the first pass the nickel is bonded to both the molybdenum and the chrome-containing alloy and the chrome-containing alloy is thus never exposed to an oxidizing atmosphere when heated. It is preferred to use either Inconel or Nichrome as a high-temperature cladding material. Inconel is a trademark of International Nickel Company and Nichrome is a trademark of Driver-Harris Company, Harrison, New Jersey. There are various types of nickel-chrome containing alloys manufactured under these trademarks and, as a specific example, the alloy designated "Inconel X" has as major constituents 76% nickel, 15% chromium and 9% iron. The alloy designated as Nichrome V has at its principal constituents 80% nickel and 20% chromium. Many other suitable nickel- and chromium-containing alloys are marketed under various trademarks. For example, the following alloys are marketed under International Nickel Company trademarks as designated; composition by principal constituents for each of these alloys are also given: Durimet K, 16% nickel, 1¼% copper, 11% chromium, balance ion; Durimet T, 2.5% molybdenum, 22% nickel, 1% copper, 19% chromium, balance iron; Hastelloy C, 5% tungsten, 17% molybdenum, 55% nickel, 15% chromium, 6% iron. In addition there are many different types of stainless steels which also contain substantial amounts of chromium and nickel. While these stainless steels would not be as suitable as the Inconel or Nichrome regarding heat- and oxidization-resisting properties, they would be suitable for many applications.

In cladding with the nickel- and chromium-containing alloys, as hereinbefore specified, the alloy plate material is first given a thin coating of nickel. Either one side or both sides of the nickel- and chromium-containing alloys may be nickel plated although it is preferable to coat only one side so that the clad material will present a surface of very high temperature resistant material such as the Inconel or Nichrome, for example. The nickel plating may be effected by well-known nickel plating techniques, such as using a nickel sulphate bath as the electrolyte and electrolytically depositing the nickel. The plate thickness is not particularly critical, but may be 0.0006 inch, for example. Plating thicknesses of 0.0002 inch to 0.0006 inch have been used successfully and 0.001 inch should be satisfactory. These thicknesses are not to be considered critical and may vary with the intended application.

It should be noted that in the case of either the Kovar or the nickel cladding material or the high-temperature resistant cladding material which is nickel plated, the original breakdown rolling should be made at the proper temperatures and should effect a proper reduction in size in order to insure a good bonding of the cladding material to the molybdenum. Excessive temperatures cause excessive nickel diffusion into the molybdenum with a resulting formation of an excessively thick non-ductile intermetallic phase between the molybdenum and the cladding material. If the temperatures are too low, the molybdenum will be too difficult to roll with resulting stress formations. The first pass should effectively bond the cladding material to the molybdenum and successive heating periods after the first pass need not be made in a non-oxidizing atmosphere, but may be made in air.

After the first pass, the material, which still retains considerable heat from the initial heating, is again heated to between 1000° C. and 1150° C. and then rolled through a second pass to reduce the material thickness by a further 15% to 40%. Thereafter, before each pass through the rolling mill, the material is heated as before the second pass and a material thickness reduction of 15% to 40% is effected. The preferred heating temperature for each pass is about 1050° C. and the preferred thickness reduction for each pass is about 30%. This schedule of heating and rolling is continued until a rolled material thickness of about 0.090 inch is obtained. The clad material is then cleaned by methods as previously outlined to remove substantially all surface impurities therefrom and the clean clad material is annealed in a non-oxidizing atmosphere such as hydrogen, argon, etc. at between 850° C. to 1100° C. for between about 3 minutes to 3 hours, the higher the annealing temperature the shorter the annealing time. The preferred annealing schedule is a temperature of 900° C. for a period of one hour in a hydrogen atmosphere. After the annealing step, the material is allowed to cool slowly in a non-oxidizing atmosphere for about one-half hour, for example.

If it is desired to reduce the material thickness below about 0.090 inch, the rolled and cleaned material is heated to a temperature of between about 500° C. to 600° C., a heating temperature of 550° C. being satisfactory. The material thickness is then reduced from 0.090 inch to about 0.040 inch either in one pass or in a succession of passes and the material is thereafter annealed and cooled in a non-oxidizing atmosphere, in accordance with the schedule outline for the first annealing. If 0.040 inch is to be the final thickness, the material may be cleaned by methods as previously outlined, if desired.

If a further reduction in material thickness is desired, such a reduction is effected by heating the material between about 500° C. to 600° C., 550° C. being satisfactory, and reducing the material thickness to about 0.030 inch, either in one pass or a succession of passes. After this the material is cleaned by methods as previously outlined to remove substantially all surface impurities therefrom. The rolled and cleaned material is thereafter annealed by a schedule as previously outlined.

If a still further reduction in material thickness is desired, the material need only be warmed to between about 150° C. to 200° C. and rolled to a thickness of about 0.020 in., either in a single pass or a succession of passes. After this the material is annealed by the schedule as previously outlined and if this is to be the final thickness, the material is given a cleaning by methods as previously outlined.

If a still further reduction in thickness is desired, this may be effected by cold rolling and after the final thickness is obtained, the material is then annealed by a schedule as previously outlined. If desired, the material may again be cleaned by methods as previously outlined.

It will be recognized that the objects of the invention have been achieved by providing a simplified process for cladding molybdenum wherein vacuum outgassing procedures and time-comsuming preliminary cladding procedures have been eliminated. In addition there has been provided a preferred heating and rolling schedule for cladding molybdenum. Also, there has been provided, as an article of manufacture, molybdenum which is clad with high temperature resistant alloys which contain substantial amounts of nickel and chromium.

While in accordance with the patent statutes, one best-known embodiment has been illustrated and described

We claim:

1. The method of cladding molybdenum with sheet cladding material of one of the group consisting of nickel, an alloy having as major constituents about 55% iron, 29% nickel and 16% cobalt, an alloy having as major constituents 76% nickel, 15% chromium and 9% iron and an alloy having as major constituents 80% nickel and 20% chromium, in the case of chromium-containing alloys said sheet cladding material having a layer of nickel plated on one side thereof, which method comprises cleaning a sheet of said cladding material and molybdenum plate material to remove substantially all surface impurities therefrom, tightly wrapping said cleaned sheet material entirely around said molybdenum plate material with the sheet material surfaces which are richest in nickel adjacent said molybdenum plate and so that said wrapped sheet material slightly overlaps itself with some sheet material projecting beyond the ends of said wrapped plate material, peening said projecting sheet material completely over the ends of said wrapped plate material, heating said wrapped plate material to a temperature of between 1000° C. to 1150° C. in a non-oxidizing atmosphere, rolling said heated wrapped plate through a first pass in a non-oxidizing atmosphere to reduce the plate thickness by between 15% to 40%, and thereafter heating and rolling to a desired material thickness according to a predetermined schedule.

2. A heating and rolling schedule for clad molybdenum sheet material as specified in claim 1, wherein said material is further reduced in thickness by heating to between 1000° C. to 1150° C. and rolling through a second pass to reduce said material thickness by 15% to 40%, thereafter repeating said 1000° C.–1150° C. heating and said 15%–40% thickness reduction rolling schedule until a rolled material thickness of about 0.090 inch is obtained, cleaning said rolled material to remove substantially all surface impurities therefrom, and annealing said rolled, cleaned material in a non-oxidizing atmosphere at between 850° C. to 1100° C. for between about 3 minutes to 3 hours, the higher the annealing temperatures, the shorter the time.

3. A heating and rolling schedule for clad molybdenum sheet material as specified in claim 2 wherein further reductions in material thickness are effected by heating to a temperature of between about 500° C. to 600° C. and rolling to a thickness of about 0.040 inch, and thereafter annealing at between 850° C. to 1100° C. for between about 3 minutes to 3 hours, the higher the annealing temperature the shorter the time.

4. A heating and rolling schedule for cladding molybdenum sheet material as specified in claim 3, wherein further reductions in material thickness are effected by heating between about 500° C. to 600° C. and rolling to a thickness of about 0.030 inch, cleaning said rolled material to remove substantially all surface impurities therefrom, and thereafter annealing in a non-oxidizing atmosphere at between 850° C. to 1100° C. for between about 3 minutes to 3 hours, the higher the annealing temperature the shorter the time.

5. A heating and rolling schedule for cladding molybdenum sheet material as specified in claim 4, wherein further reductions in material thickness are effected by warming said material to between about 150° C. to 200° C. and rolling to a thickness of about 0.020 inch, and annealing said rolled, cleaned material in a non-oxidizing atmosphere at between 850° C. to 1100° C. for between about 3 minutes to 3 hours, the higher the annealing temperature the shorter the time.

6. A heating and rolling schedule for clad molybdenum sheet material as specified in claim 5, wherein further reductions in material thickness are effected by cold rolling, and thereafter annealing said rolled material in a non-oxidizing atmosphere at between 850° C. to 1100° C. for between about 3 minutes to 3 hours, the higher the annealing temperature the shorter the time.

7. The method of cladding molybdenum with a cladding material consisting of nickel, comprising cleaning nickel sheet material and molybdenum plate material to remove substantially all surface impurities therefrom, tightly wrapping said cleaned sheet material entirely around said molybdenum plate material so that said wrapped sheet material slightly overlaps itself with some sheet material projecting beyond the ends of said wrapped plate material, peening said projecting sheet material completely over the ends of said wrapped plate material, heating said wrapped plate material to a temerature of between 1000° C. and 1150° C. in a non-oxidizing atmosphere, rolling said heated wrapped plate material through a first pass in a non-oxidizing atmosphere to reduce the plate thickness by between 15% to 40%, and thereafter heating and rolling to a desired material thickness according to a predetermined schedule.

8. The method of cladding molybdenum with a cladding material consisting of an alloy having as its major constituents about 55% iron, 29% nickel and 16% cobalt, comprising cleaning a sheet of said alloy and molybdenum plate material to remove substantially all surface impurities therefrom, tightly wrapping said cleaned alloy sheet entirely around said molybdenum plate material so that said wrapped alloy sheet slightly overlaps itself with some alloy sheet projecting beyond the ends of said wrapped plate material, peening said projecting alloy sheet completely over the ends of said wrapped plate material, heating said wrapped plate material to a temperature of between 1000° C. and 1150° C. in a non-oxidizing atmosphere, rolling said heated wrapped plate material through a first pass in a non-oxidizing atmosphere to reduce the plate thickness by between 15% to 40%, and thereafter heating and rolling to a desired material thickness according to a predetermined schedule.

9. The method of cladding molybdenum with sheet cladding material consisting of an alloy having as major constituents 76% nickel, 15% chromium and 9% iron and having a layer of nickel plated on one side thereof, which method comprises cleaning a sheet of said alloy and molybdenum plate material to remove substantially all surface impurities therefrom, tightly wrapping said cleaned alloy sheet entirely around said molybdenum plate material with the alloy sheet surface richest in nickel adjacent said molybdenum plate and so that said wrapped alloy sheet slightly overlaps itself with some alloy sheet projecting beyond the ends of wrapped plate material, peening said projecting alloy sheet completely over the ends of said wrapped plate material, heating said wrapped plate material to a temperature of between 1000° C. to 1150° C. in a non-oxidizing atmosphere, rolling said heated wrapped plate material through a first pass in a non-oxidizing atmosphere to reduce the plate thickness by between 15% to 40%, and thereafter heating and rolling to a desired material thickness according to a predetermined schedule.

10. The method of cladding molybdenum with sheet cladding material having as major constituents 80% nickel and 20% chromium and having a layer of nickel plated on one side thereof, which method comprises cleaning said sheet cladding material and molybdenum plate material to remove substantially all surface impurities therefrom, tightly wrapping said cleaned sheet material entirely around said molybdenum plate with the sheet material surfaces which are richest in nickel adjacent said molybdenum plate and so that said wrapped sheet material slightly overlaps itself with some sheet material projecting beyond the ends of said wrapped plate material, peening said projecting sheet material completely over the ends of said wrapped plate material, heating said wrapped plate material to a temperature of between 1000° C. to 1150° C. in a non-oxidizing atmosphere, rolling said heated wrapped plate through a first pass in a non-oxidizing atmosphere to reduce the plate thickness by between 15% to 40%, and thereafter heating and rolling to a desired material thickness according to a predetermined schedule.

References Cited in the file of this patent

UNITED STATES PATENTS

| | | |
|---|---|---|
| 2,666,721 | Bechtold et al. | Jan. 19, 1954 |
| 2,692,216 | Baker | Oct. 19, 1954 |
| 2,744,314 | Kinney | May 8, 1956 |

OTHER REFERENCES

Preprint 89-30 of the Electrochemical Society, p. 384, published in 1946.

"Transactions," American Society for Metals, vol. 44, 1952, pp. 176–180, 187–189.

"Fabrication and Evaluation of Thin Clad Sheets of Molybdenum"; Battelle Memorial Inst., BMI, by La Chance, Craighead, and Jaffe, Nov. 25, 1953.